(12) United States Patent
Vedam et al.

(10) Patent No.: US 10,887,786 B2
(45) Date of Patent: Jan. 5, 2021

(54) NEAR-UNIFORM LOAD BALANCING IN A VISIBILITY NETWORK VIA USAGE PREDICTION

(71) Applicant: Extreme Networks, Inc., San Jose, CA (US)

(72) Inventors: Jude Pragash Vedam, Bangalore (IN); Deepak Hegde, Bangalore (IN); Ashwin Naresh, Bangalore (IN); Shubharanjan Dasgupta, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/344,561

(22) PCT Filed: Oct. 19, 2017

(86) PCT No.: PCT/US2017/057435
§ 371 (c)(1),
(2) Date: Apr. 24, 2019

(87) PCT Pub. No.: WO2018/080898
PCT Pub. Date: May 3, 2018

(65) Prior Publication Data
US 2019/0297520 A1 Sep. 26, 2019

(30) Foreign Application Priority Data

Oct. 25, 2016 (IN) .............................. 201641036572

(51) Int. Cl.
*H04L 12/24* (2006.01)
*H04L 12/26* (2006.01)
(Continued)

(52) U.S. Cl.
CPC .......... *H04W 28/0215* (2013.01); *G06N 3/04* (2013.01); *G06N 3/0454* (2013.01);
(Continued)

(58) Field of Classification Search
CPC .. H04L 43/028; H04L 67/141; H04L 67/2809
See application file for complete search history.

(56) References Cited

U.S. PATENT DOCUMENTS 9,866,478 B2 * 1/2018 Laxman ................. H04L 45/745
2008/0016214 A1 * 1/2008 Galluzzo ............... H04L 67/322
709/226

(Continued)

FOREIGN PATENT DOCUMENTS

| EP | 2930891 A1 | 10/2015 |
| GB | 2499936 A | 9/2013 |
| WO | WO 2015/114420 A1 | 8/2015 |

OTHER PUBLICATIONS

International Search Report and Written Opinion of the International Searching Authority directed to related International Patent Application No. PCT/US2017/057435, dated Mar. 15, 2018; 7 pages.

(Continued)

*Primary Examiner* — Raj Jain
(74) *Attorney, Agent, or Firm* — Sterne, Kessler, Goldstein & Fox P.L.L.C.

(57) ABSTRACT

Techniques for performing near-uniform load balancing in a visibility network based on usage prediction are provided. According to one embodiment, a packet broker of the visibility network can receive a control packet replicated from a core network, where the control packet includes a user or device identifier and a request to create a user session for a user identified by the user/device identifier. The packet broker can further determine, based on the user/device identifier and one or more other parameters, a rank value for (Continued)

the user session, where the rank value indicates an amount of network traffic that the user is likely to generate in the core network during the user session. The packet broker can then select an egress port for the user session based on the rank value and forward subsequent control and data traffic for the user session through the selected egress port.

20 Claims, 9 Drawing Sheets

(51) Int. Cl.
| | |
|---|---|
| H04L 29/08 | (2006.01) |
| H04W 28/02 | (2009.01) |
| G06N 3/04 | (2006.01) |
| G06N 3/08 | (2006.01) |
| H04L 12/803 | (2013.01) |
| H04L 12/801 | (2013.01) |

(52) U.S. Cl.
CPC ............ *G06N 3/08* (2013.01); *H04L 41/147* (2013.01); *H04L 41/16* (2013.01); *H04L 43/0876* (2013.01); *H04L 47/125* (2013.01); *H04L 47/19* (2013.01); *H04L 67/141* (2013.01)

(56) References Cited

U.S. PATENT DOCUMENTS

| | | | |
|---|---|---|---|
| 2012/0096461 A1* | 4/2012 | Goswami | G06F 9/45558 718/1 |
| 2013/0215748 A1 | 8/2013 | Ratakonda et al. | |
| 2014/0101305 A1 | 4/2014 | Kelley | |
| 2015/0172958 A1 | 6/2015 | Allanki et al. | |
| 2016/0014006 A1 | 1/2016 | Leong et al. | |
| 2016/0285685 A1* | 9/2016 | Zhou | H04L 41/0816 |
| 2017/0237632 A1* | 8/2017 | Hegde | H04L 47/125 370/252 |
| 2017/0237633 A1* | 8/2017 | Hegde | H04J 11/00 370/252 |
| 2019/0297520 A1* | 9/2019 | Vedam | H04L 41/147 |

OTHER PUBLICATIONS

International Preliminary Report on Patentability directed to related International Patent Application No. PCT/US2017/057435, dated Apr. 30, 2019; 6 pages.

Extended European Search Report for EP Application No. 17864734.3, dated May 6, 2020, 13 pages.

* cited by examiner

NEAR-UNIFORM LOAD BALANCING IN A VISIBILITY NETWORK VIA USAGE PREDICTION

CROSS-REFERENCES TO RELATED APPLICATIONS

The present application claims the benefit and priority of India Provisional Application No. 201641036572, filed Oct. 25, 2016, entitled "SYSTEM AND METHOD FOR NEAR-UNIFORM LOAD BALANCING OF PACKETS IN PASSIVE VISIBILITY NETWORK USING USAGE PREDICTION SYSTEM." The entire contents of this application are incorporated herein by reference in its entirety for all purposes.

BACKGROUND

In the field of computer networking, a visibility network (also known as a "visibility fabric") is a type of network that facilitates the monitoring and analysis of traffic flowing through another, "core" network (e.g., a production network). The reasons for deploying a visibility network are varied and can include network management and optimization, business intelligence/reporting, compliance validation, service assurance, security monitoring, and so on.

FIG. 1 depicts an example visibility network 100 according to an embodiment. As shown, visibility network 100 includes a number of taps 102 that are deployed within a core network 104. Taps 102 are configured to replicate control and data traffic that is exchanged between network elements in core network 104 and forward the replicated traffic to a packet broker 106 (note that, in addition to or in lieu of taps 102, one or more routers or switches in core network 104 can be tasked to replicate and forward data/control traffic to packet broker 106 using their respective SPAN or mirror functions). Packet broker 106 can perform various packet processing functions on the replicated traffic, such as removing protocol headers, filtering/classifying packets based on configured rules, and so on. Packet broker 106 can then forward the processed traffic to one or more analytic probes/tools 108, which can carry out various calculations and analyses on the traffic in accordance with the business goals/purposes of visibility network 100 (e.g., calculation of key performance indicators (KPIs), detection of traffic anomalies, generation of reports, etc.).

One packet processing function that packet broker 106 is commonly tasked to perform is load balancing the traffic replicated from core network 104 across the packet broker's egress ports, and thus across analytic probes/tools 108. In current packet broker implementations, this load balancing is achieved by extracting a user or device identifier from an initial control packet received from core network 104 that indicates the start of a new user session and computing a hash function corresponding to [user/device identifier] modulo [total # of egress ports]. The result of this computation is an egress port identifier (ID), which packet broker 106 associates with the user session by storing it in a state machine for the session. Packet broker 106 then forwards all future control and data traffic received for that user session to the egress port identified by the computed egress port ID (and thus, to a particular analytic probe/tool 108).

While the conventional load balancing approach described above is effective in distributing replicated traffic across analytic probes/tools 108 in a manner that causes each probe/tool 108 to receive traffic for a relatively uniform number of user sessions, in many cases the amount of network traffic generated in core network 104 will vary significantly from one user to another. For example, assume core network 104 is a mobile 3G or LTE network. In this scenario, a user that is using his/her mobile device as a mobile hotspot in 3G/LTE network 104 will consume significantly more network bandwidth (and thus generate more network traffic) than a user that is simply making a voice call. This means that some probes/tools may receive significantly more replicated traffic than others (depending on the particular user sessions assigned to that probe/tool), which undesirably results in uneven processing load across probes/tools 108.

SUMMARY

Techniques for performing near-uniform load balancing in a visibility network based on usage prediction are provided. According to one embodiment, a packet broker of the visibility network can receive a control packet replicated from a core network, where the control packet includes a user or device identifier and a request to create a user session for a user identified by the user/device identifier. The packet broker can further determine, based on the user/device identifier and one or more other parameters, a rank value for the user session, where the rank value indicates an amount of network traffic that the user is likely to generate in the core network during the user session. The packet broker can then select an egress port for the user session based on the rank value and forward subsequent control and data traffic for the user session through the selected egress port.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure provides techniques that can be implemented by a packet broker of a visibility network for load balancing replicated traffic across analytic probes/tools such that the amount of traffic received by each probe/tool (rather than simply the number of user sessions assigned to each probe/tool) is near uniform.

At a high level, this is achieved via a usage prediction system (UPS) that incorporates a neural network-based prediction model. With this model, UPS can accurately predict, for a given user session, the amount of traffic that will likely be generated by the user (or stated another way, the amount of network bandwidth that will likely be consumed by the user) during the user session. UPS can use this prediction to generate a rank value for the user session, such that higher rank values indicate that the user will likely generate more traffic during the user session and lower rank values indicate that the user will likely generate less traffic during the user session (or vice versa). The packet broker can then calculate a hash based on the generated rank value in order to assign the user session to a given egress port and thus to a given analytic probe/tool.

The foregoing and other aspects of the present disclosure are described in further detail below.

2. Visibility Network and High-Level Design

Figure 1:
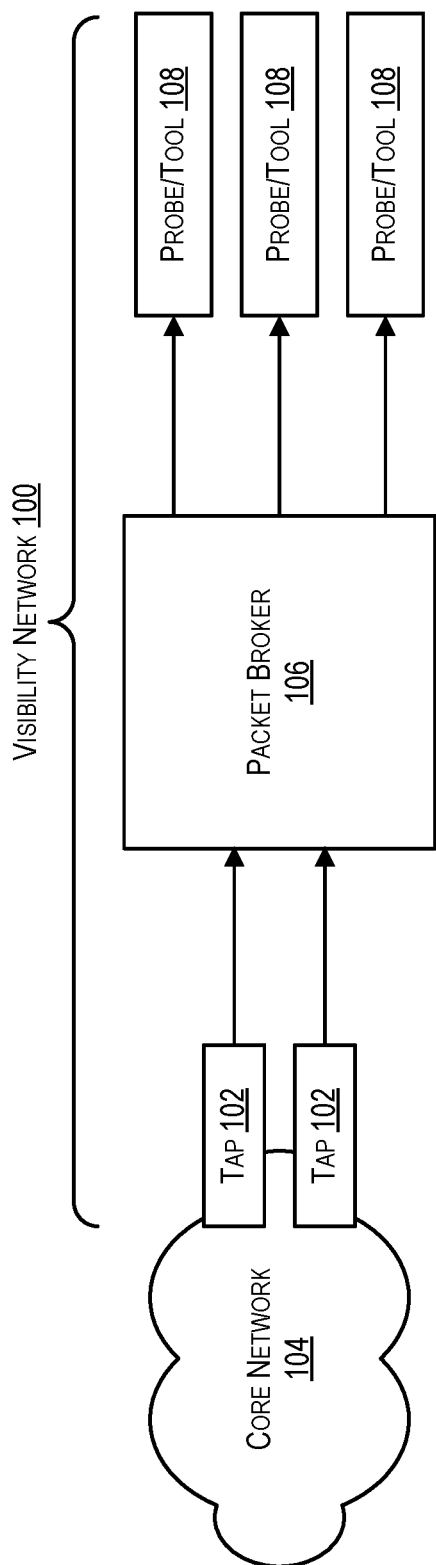
FIG. 1 depicts an example visibility network.
Figure 2:
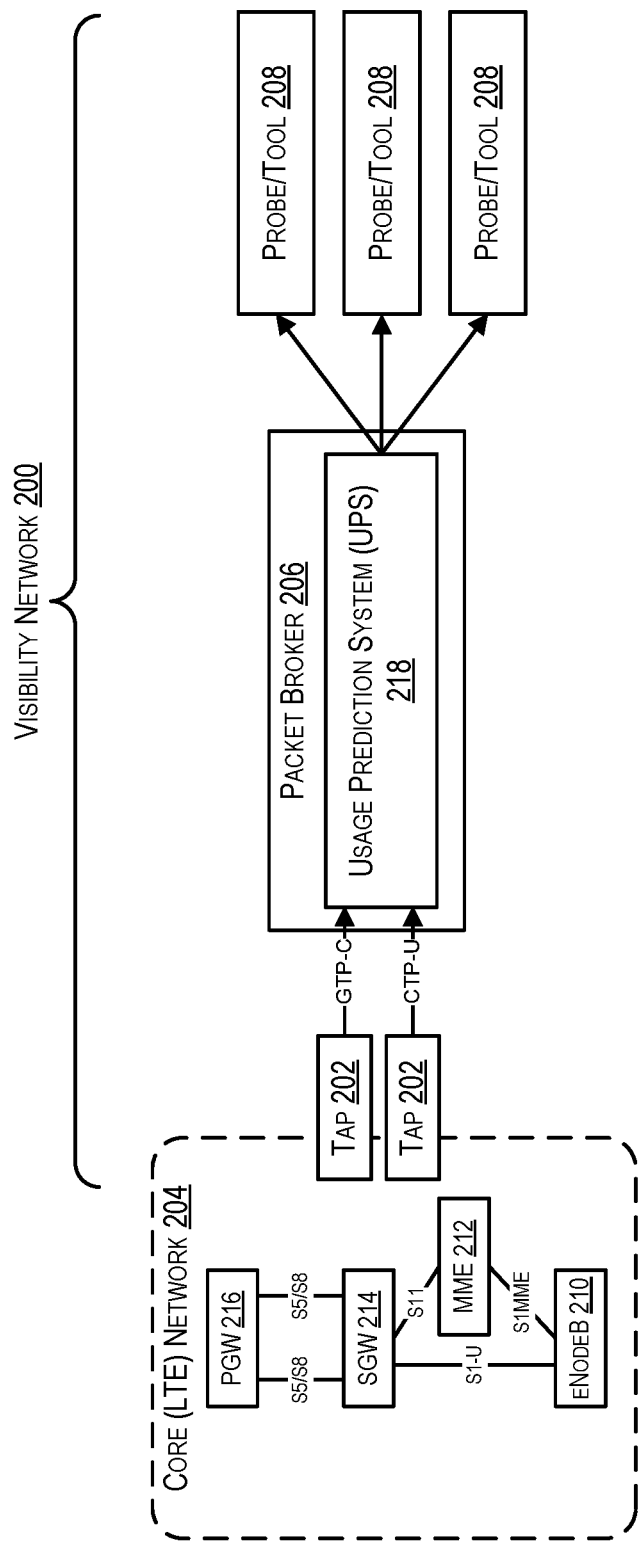
FIG. 2 depicts a visibility network that implements the usage prediction-based load balancing techniques of the present disclosure according to an embodiment.

FIG. 2 depicts a visibility network 200 that implements the usage prediction-based load balancing techniques of the present disclosure according to an embodiment. As shown, visibility network 200 includes a number of taps 202 that are deployed in a core network 204 and are configured to replicate traffic exchanged in network 204 to a packet broker 206. In FIG. 2, core network 204 is a mobile LTE network that comprises network elements specific to this type of network, such as an eNodeB 210, a mobility management entity (MME) 212, a serving gateway (SGW) 214, and a packet data network gateway (PGW) 216 which connects to an external packet data network such as the Internet. Further, in this particular example, taps 202 are configured to replicate and forward GTP-C and GTP-U traffic that is exchanged on certain interfaces of core network 204. However, it should be appreciated that core network 204 can be any other type of computer network known in the art, such as a mobile 3G network, an enterprise local area network (LAN) or wide area network (WAN), etc.

Upon receiving the replicated traffic via taps 202, packet broker 206 can perform various types of packet processing functions on the traffic (as configured/assigned by an operator of visibility network 200) and can forward the processed traffic to one or more analytic probes/tools 208 for analysis. In one embodiment, packet broker 206 can be implemented solely in hardware, such as in the form of a network switch or router that relies on ASIC or FPGA-based packet processors to execute its assigned packet processing functions based on rules that are programmed into hardware memory tables (e.g., CAM tables) resident on the packet processors and/or line cards of the device. In another embodiment, packet broker 206 can be implemented solely in software that runs on, e.g., one or more general purpose physical or virtual computer systems. In yet another embodiment, packet broker 206 can be implemented using a combination of hardware and software, such as a combination of a hardware-based basic packet broker and a software-based "session director" cluster as described in co-owned U.S. patent application Ser. No. 15/205,889, entitled "Software-based Packet Broker," the entire contents of which are incorporated herein by reference in its entirety for all purposes.

Figure 3:
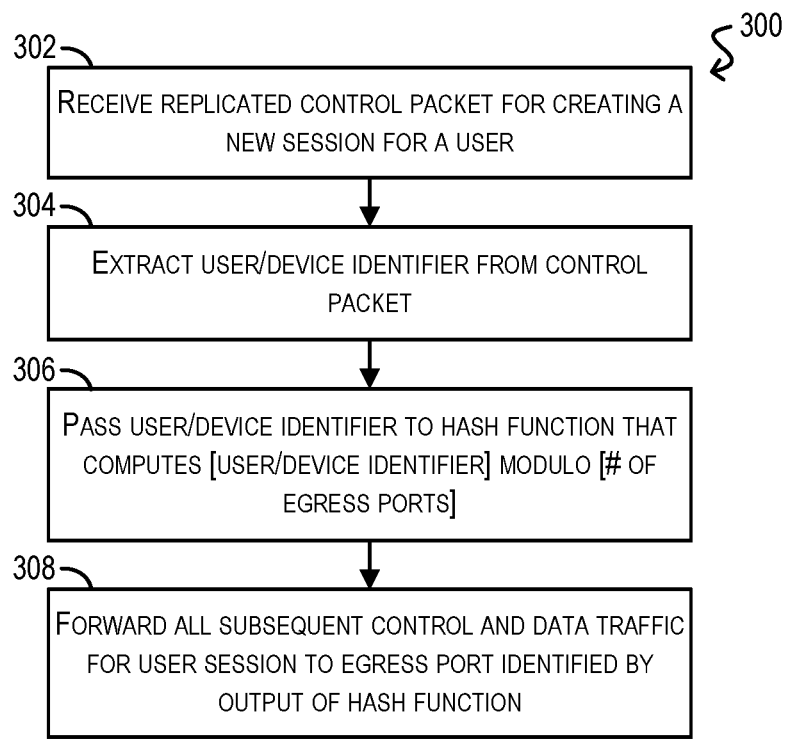
FIG. 3 depicts a conventional load balancing workflow.

As noted in the Background section, a common function performed by existing packet brokers is load balancing replicated traffic across its egress ports (and thus, across analytic probes/tools) such that each probe/tool is assigned a relative uniform number of users/user sessions. A workflow 300 of this conventional load balancing process is shown in FIG. 3.

Starting with block 302 of flowchart 300, the packet broker receives a replicated control packet for creating a new session for a particular user (e.g., a GTP-C "create session request" packet in the case of an LTE core network).

At block 304, the packet broker extracts a user or device identifier from the control packet. For example, the user/device identifier may be an International Mobile Subscriber Identity (IMSI), Mobile Station International Subscriber Directory Number (MSISDN), or an International Mobile Equipment Identity (IMEI).

At block 306, the packet broker passes the user/device identifier as input to a hash function that calculates the identifier value modulo the total number of egress ports of the packet broker. This results in an egress port identifier for the user session.

Finally, at block 308, the packet broker forwards all subsequent control and data traffic pertaining to that user session to the egress port identified at block 306 (and thus, to the specific analytic probe/tool connected to that egress port).

The main problem with conventional load balancing workflow 300 is that its sole load balancing criterion is user/device identifier. This generally works well when each user generates approximately the same amount of traffic; however, in practice, the amount of traffic generated by each user will vary substantially based on various factors (e.g., type of device used, user behavior, etc.). As a result, certain probes/tools may receive significantly more traffic than others (even though the number of users/user sessions assigned to each probe/tool is roughly the same), which can cause performance problems on the overloaded probes/tools and under-utilization of the under-loaded probes/tools.

To address this and other similar issues, packet broker 206 of FIG. 2 is enhanced to include a novel usage prediction system (UPS) 218 according to certain embodiments. Generally speaking, UPS 218 can predict, using machine learning (i.e., neural network-based) algorithms, the amount of traffic that will be generated by a given user (i.e., the amount of network bandwidth that will be consumed by the user) and can quantify this amount in the form of a rank value that is assigned to the user's session. This prediction can be based on a number of different input parameters, such as historical data regarding the amount of traffic generated by that user in previous sessions, information regarding the user's subscription plan (in the case where the network is an mobile LTE network or other type of network where the user pays a fee to access), information regarding the user's mobility patterns, information regarding current time of day and calendar, a previously assigned rank value for that user, and so on. Packet broker 206 can then use this rank value at the time a new session request is received in order to assign the user session to a particular egress port (and thus analytic probe/tool 208).

Figure 4:
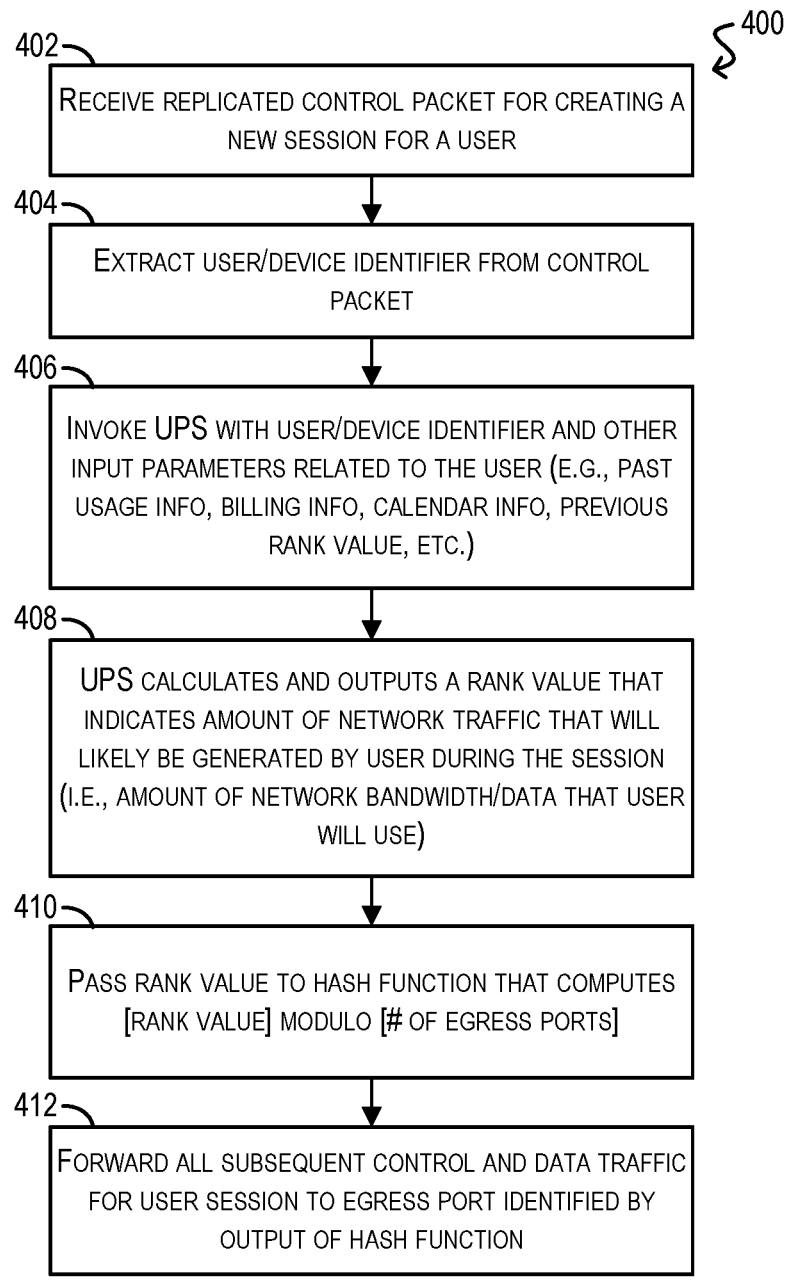
FIG. 4 depicts a usage prediction-based load balancing workflow according to an embodiment.

This high-level process is shown as workflow 400 in FIG. 4. The first two blocks of workflow 400 (402 and 404) are substantially the same as workflow 300 of FIG. 3; in particular, packet broker 206 receives an incoming control packet (e.g., GTP-C packet in the case of an LTE network) for creating a new session for a particular user and extracts a user or device identifier associated with the user session to be created.

However, at block 406, packet broker 206 can invoke UPS 218, providing as input one or more of the parameters mentioned above. In the case where an input parameter is not specifically maintained on packet broker 206, packet broker 206 can query the parameter from a separate device/system (e.g., an external billing system).

In response, UPS 218 can calculate and output a rank value that indicates the amount of traffic that will likely be generated by the user during the session (block 408). In one set of embodiments, a higher rank value indicates that the user will likely generate a higher amount of traffic during the session, while a lower rank value indicates that the user will likely generate a lower amount of traffic during the session.

At block 410, packet broker 206 can use the rank value as an input to a hash function that calculates the rank value modulo the total number of egress ports of the packet broker. The resulting value of this hash function is an egress port identifier that identifies the egress port, and thus analytic probe/tool 208, that the new user session will be assigned to.

Finally, at block 412, packet broker 206 can forward all subsequent control and data traffic pertaining to that user session to the egress port determined at block 410.

With the high-level approach shown in FIG. 4 and described above, packet broker 206 can ensure that each analytic probe/tool 208 receives a relatively equal amount of traffic (in terms of, e.g., packets or bits per second). This is in contrast to the conventional load balancing approach shown in FIG. 3, which solely load balances based on user/device identifiers and thus can result in differing amounts of traffic being sent to each analytic probe/tool 208 (depending on the amount of traffic generated by each user/user session). Accordingly, the approach of FIG. 4 allows for more uniform load balancing across analytic probes/tools 208 from a traffic throughput perspective, which in turn allows probes/tools 208 to be utilized optimally. Additional details regarding the implementation of UPS 218 are provided in the sections that follow.

It should be appreciated that FIGS. 1-4 are illustrative and not intended to limit embodiments of the present disclosure. For example, although UPS 218 is shown as being an integral part of packet broker 206 in FIG. 2, in some embodiments UPS 218 may be implemented on a separate system that is communicatively coupled with packet broker 206, such as a separate computer server or network device (e.g., switch or router). Further, although workflows 300 and 400 are shown as distinct workflows, in some embodiments packet broker 206 may implement a user-configurable switch that allows it perform load balancing according to the conventional workflow shown in FIG. 3 or the usage predication-based workflow shown in FIG. 4. One of ordinary skill in the art will recognize other variations, modifications, and alternatives.

3. UPS Architecture
3.1 Inputs and Outputs

Figure 5:
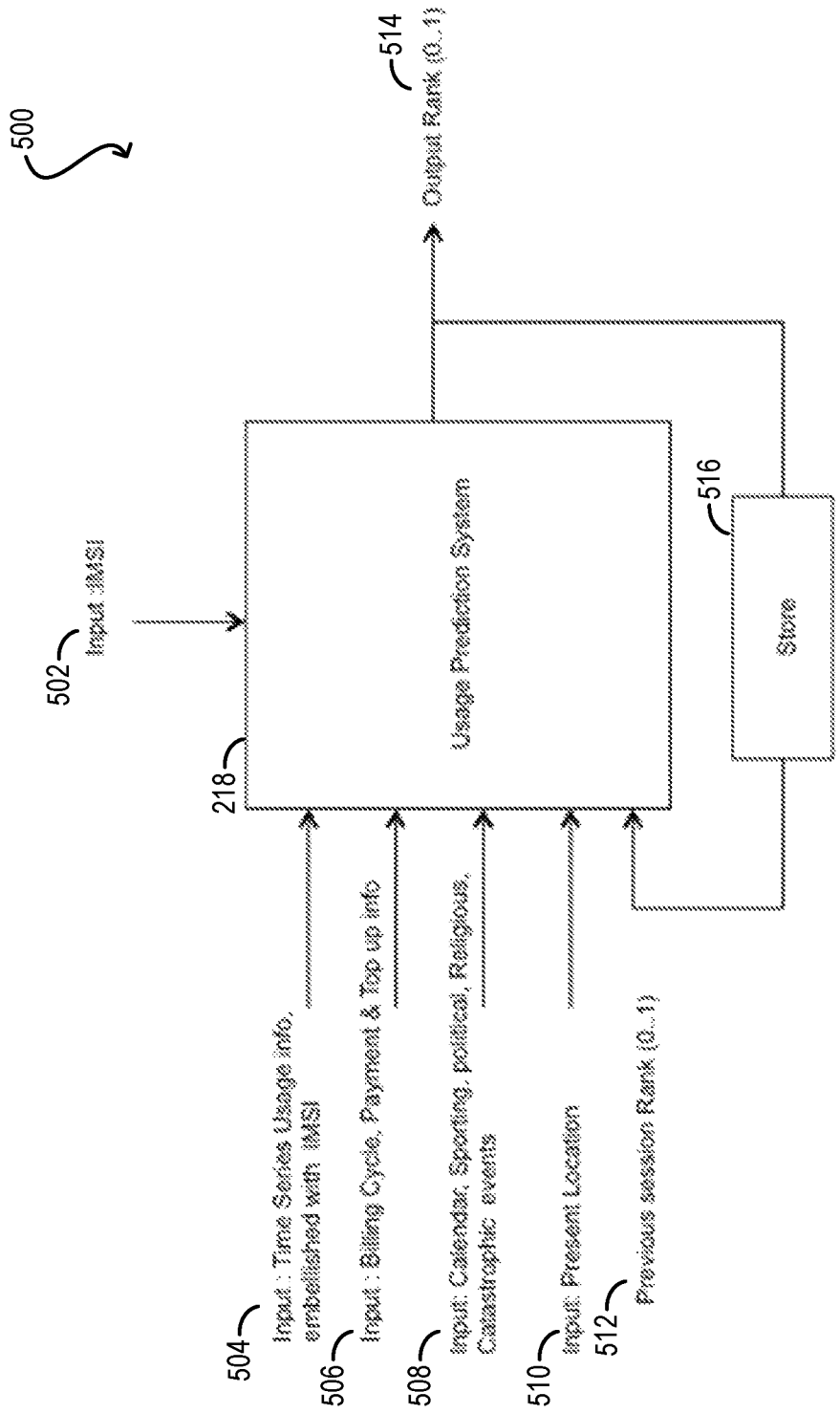
FIG. 5 is a schematic diagram of a usage prediction system (UPS) according to an embodiment.

FIG. 5 is a simplified block diagram 500 illustrating the inputs and outputs of UPS 218 according to an embodiment. As shown, UPS 218 receives a user or device identifier (e.g., IMSI, MSISDN, IMEI, etc.) 502 associated with a new/current user session. In addition, UPS 218 can receive a number of other input parameters including: (1) time series usage information 504 pertaining to user/device identifier 502 (e.g., volume of data/traffic generated by the user in previous sessions); (2) billing-related information 506 pertaining to user/device identifier 502 (e.g., billing cycle, monthly usage quota, payment and top-up information, etc.); (3) calendar information 508 (e.g., holidays, sporting events, political events, religious events, etc.); (4) present location 510 of the user or device associated with user/device identifier 502; and (5) a previous rank value 512 assigned to user/device identifier 502 for a previous session. For input parameters that originate from outside packet broker 206 (e.g., billing information 506, which may come from a separate billing system), UPS 218 can expose an application programming interface (API), such as a REST API, that enables external systems to provide the parameters to UPS 218.

Using the various input parameters shown in FIG. 5, UPS 218 determines and outputs a scalar rank value 514 that indicates the amount of network traffic that the user associated with user/device identifier 502 is likely to generate for the current session. In a particular embodiment, rank value 514 can range from zero to one, with a lower value indicating that the user is likely to generate a lower amount of traffic, and a higher value indicating that the user is likely to generate a higher amount of traffic. Rank value 514 can then be provided to packet broker 206 in order to determine an egress port for the user session as discussed with respect to FIG. 4. In addition, rank value 514 can be saved to a data store 516 maintained by UPS 218 and be used as an input (i.e., input 512) to UPS 218 for future user session(s) associated with user/device identifier 502.

3.2 Internal Implementation

Figure 6:
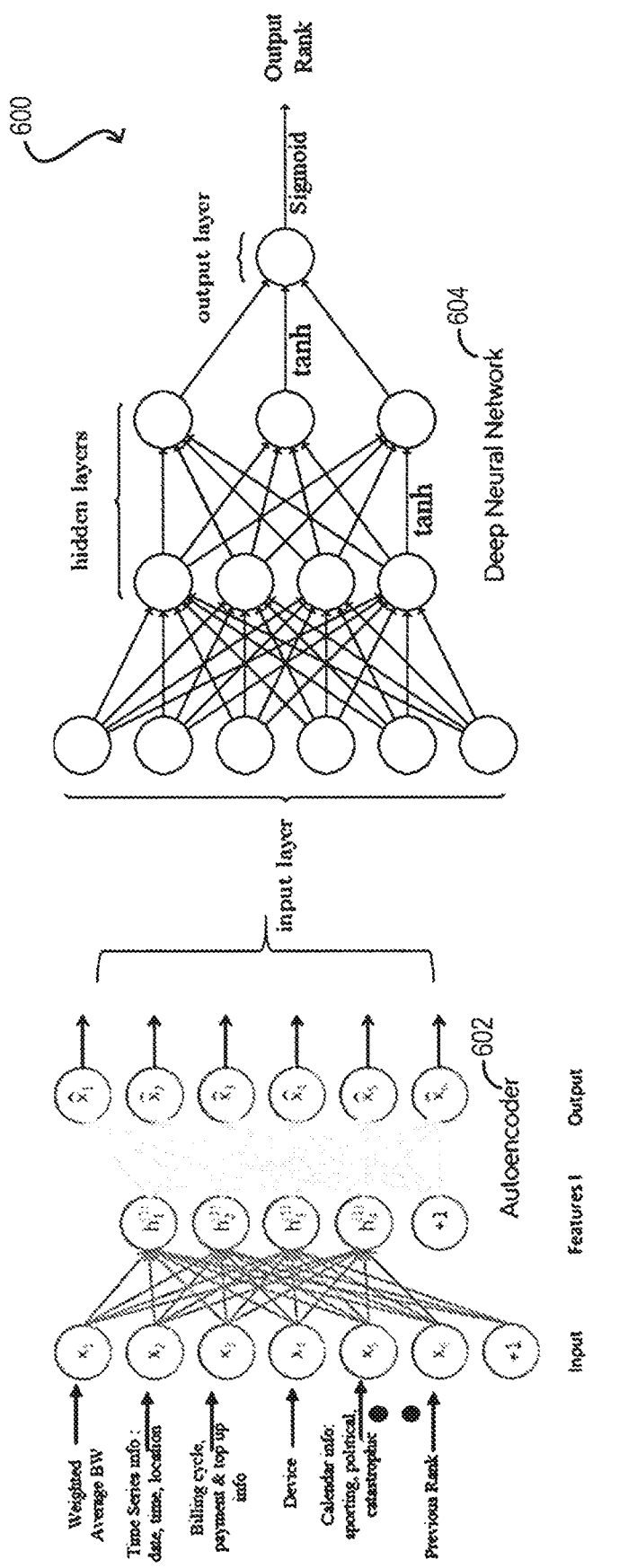
FIG. 6 depicts a neural network-based predictor that may be implemented by the UPS according to an embodiment.

In various embodiments, UPS 218 can make use of a neural network-based predictor to predict the rank value for each user that is provided as input (via user/device identifier 502) to the system. FIG. 6 depicts a schematic diagram of this neural network-based predictor (600) according to an embodiment. As shown, predictor 600 includes two neural network stages: an "autoencoder" stage 602 and a "deep neural network" stage 604. UPS 218 can create and maintain one instance of predictor 600 for each user/device identifier processed by the system.

Autoencoder stage 602 can receive the various input parameters 502-512 discussed with respect to FIG. 5. In a particular embodiment, autoencoder stage 602 can require, as input, user/device identifier 502 as well as time series usage information 504 (in the form of, e.g., volume of traffic generated by the user during the previous session, average traffic generated by the user over the last n sessions, or some other similar usage metric). In this embodiment, the remaining input parameters 504-512 can be optional depending on their availability for the present user. In other embodiments, some other permutation of input parameters 502-512 may be deemed to be required.

Autoencoder stage 602 can then process the input parameters via one or more hidden layers in order to reduce the number of variables that are actually likely to influence the usage of the user, and can pass the results of its processing to deep neural network stage 604.

Deep neural network stage 604 can receive the output of autoencoder stage 602 and process this output via one or more hidden layers (in one embodiment, there may be exactly two hidden layers). Finally, based on this processing, deep neural network stage 604 can output the rank value for the user identified by user/device identifier 502.

3.2.1 Training the Autoencoder Stage

Generally speaking, the purpose of autoencoder stage 602 is to learn a compressed representation of the user's input information so that this compressed representation can be passed to deep neural network stage 604. Autoencoder stage 602 can be trained such that, if there are correlations among the input parameters, stage 602 will be able to discover these correlations.

In one set of embodiments, the training of autoencoder stage 602 can proceed as follows:

- Configure the input layer to have n-dimensions where each dimension corresponds to a particular input parameter (e.g., time series usage information, billing information, calendar information, location information, previous rank value, etc.)
- Configure the output layer of such that the output layer has the same number, or fewer, number of dimensions as the input layer
- Configure constraints of the network, such as the number of hidden neurons and their activation functions, so as to derive an optimal compressed representation of the input information
- Train the network using back-propagation, where the output vector is set to be equal to the input vector Autoencoder stage 602 can be periodically re-trained using the process above with information pertaining to recent user sessions. This periodicity can be, e.g., once a week, once a month, or user-configurable.

3.2.2 Training the Deep Neural Network Stage

Generally speaking, the purpose of deep neural network stage 604 is to predict the rank value of the user identified by user/device identifier 502 based on the various input parameters received and compressed via autoencoder stage 602. In one set of embodiments, the training of deep neural network stage 604 can proceed as follows:

- For a given session for a given user U, create a training dataset where the input is the vector representation output by autoencoder stage 602 and the target output is a rank value that is manually assigned based on the data used by U for the session
- Train the network using back-propagation, thereby adjusting the network's weight parameters so that the target output rank value is emitted (given the input vector)

Like autoencoder stage 602, deep neural network stage 604 can be periodically retrained. In one set of embodiments, at the end of certain user sessions, the actual bandwidth consumed by the user can be recorded and a rank value can be computed based on that usage. The computed rank value can then be compared against the predicted rank value output by deep neural network stage 604. If the difference between the computed rank value and the predicted rank value exceeds a predetermined threshold, retraining of deep neural network stage 602 can be triggered for that particular user.

3.3 Handling New Users via Clustering

In some cases, UPS 218 will need to generate rank values for "new" users (i.e., users identified by a user or device identifier that UPS 218 has not encountered before). For such new users, UPS 218 will not have historical usage information or previous rank values that UPS 218 can use as part of its rank value determination.

To address this problem, in certain embodiments UPS 218 can implement a clustering subsystem in addition to its neural network-based predictors. This clustering subsystem can take, as input, information regarding the general population of users observed by UPS 218 (e.g., usage, device type, IMSI, location, time of day, etc.) and can classify the users into a plurality of clusters based on this information. The clustering subsystem can use various known clustering algorithms for this purpose, such as K-means clustering. Then, when a rank value needs to be generated for a new, previously known user, UPS 218 can invoke the clustering subsystem to determine the cluster that the user most closes matches (i.e., should be classified in). Based on this determination, UPS 218 can retrieve average usage and rank value information for the most closely matching cluster and use these average values as input into the neural network-based predictor instance for the user. Thus, even though UPS 218 may not have historical usage and rank value data for a new user, UPS 218 can approximate what these values should be based upon the cluster that the user most closely aligns with.

Figure 7:
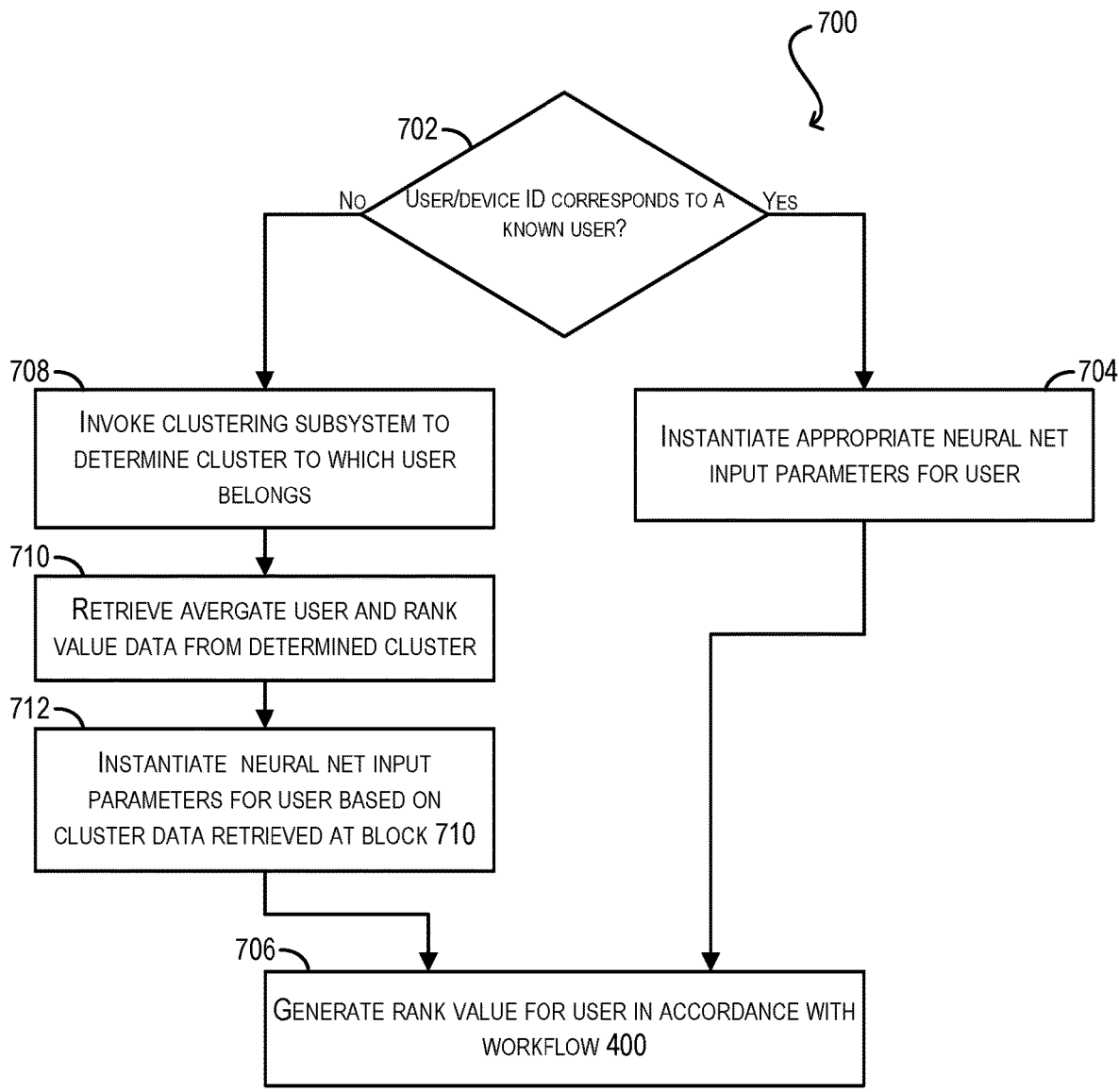
FIG. 7 depicts a workflow for determining UPS input parameters for a new user via clustering according to an embodiment.

FIG. 7 depicts a workflow 700 that illustrates the foregoing clustering mechanism according to an embodiment. Starting with block 702, UPS 218 can determine whether the user/device identifier extracted at block 404 of workflow 404 is a known identifier (i.e., a identifier that UPS 218 has processed before). If yes, UPS 218 can instantiate the appropriate neural network input parameters for the user and generate a rank value for the user in accordance with the remaining steps of FIG. 4 (blocks 704 and 706).

However, if UPS 218 determines at block 702 that the user/device identifier is new, UPS 218 can invoke the clustering subsystem to determine which cluster the user identified by the user/device identifier belongs in (based on the various parameters used to create the clusters, such as device type, location, time of day, etc.) and can retrieve average usage and rank value data from the determined cluster (blocks 708 and 710). UPS 218 can then instantiate neural network input parameters for the user based, at least in part, on the data derived from the cluster at block 710 and generate a rank value for the user (blocks 712 and 706).

It should be noted that the process of creating/updating the clusters can be repeated on a periodic basis, such as daily or every 4-6 hours, to ensure that they accurately reflect the population of users in the core network.

4. Example Network Device

Figure 8:
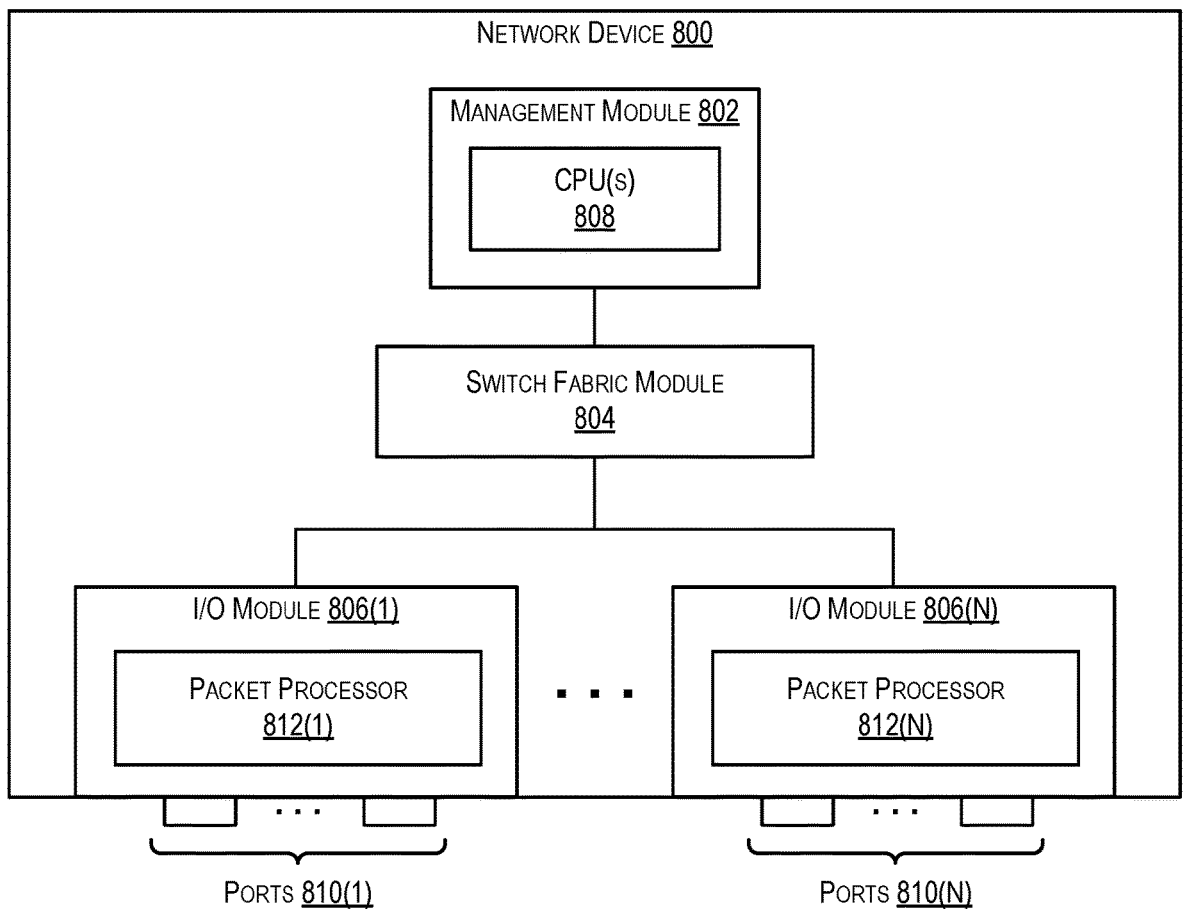
FIG. 8 depicts an example network device according to an embodiment.

FIG. 8 depicts an example network device (e.g., switch and/or router) 800 in which certain embodiments of the present disclosure may be implemented. For example, in one set of embodiments, network device 800 may be used to implement packet broker 206 of FIG. 2 (either wholly or in part).

As shown, network device 800 includes a management module 802, a switch fabric module 804, and a number of I/O modules 806(1)-806(N). Management module 802 includes one or more management CPUs 808 for managing/controlling the operation of the device. Each management CPU 808 can be a general purpose processor, such as a PowerPC, Intel, AMD, or ARM-based processor, that operates under the control of software stored in an associated memory (not shown).

Switch fabric module 804 and I/O modules 806(1)-806(N) collectively represent the data, or forwarding, plane of network device 800. Switch fabric module 804 is configured to interconnect the various other modules of network device 800. Each I/O module 806(1)-806(N) can include one or more input/output ports 810(1)-810(N) that are used by network device 800 to send and receive data packets. Each I/O module 806(1)-806(N) can also include a packet processor 812(1)-812(N). Packet processor 812(1)-812(N) is a hardware processing component (e.g., an FPGA or ASIC) that can make wire speed decisions on how to handle incoming or outgoing data packets.

It should be appreciated that network device 800 is illustrative and many other configurations having more or fewer components than network device 800 are possible.

5. Example Computer System

Figure 9:
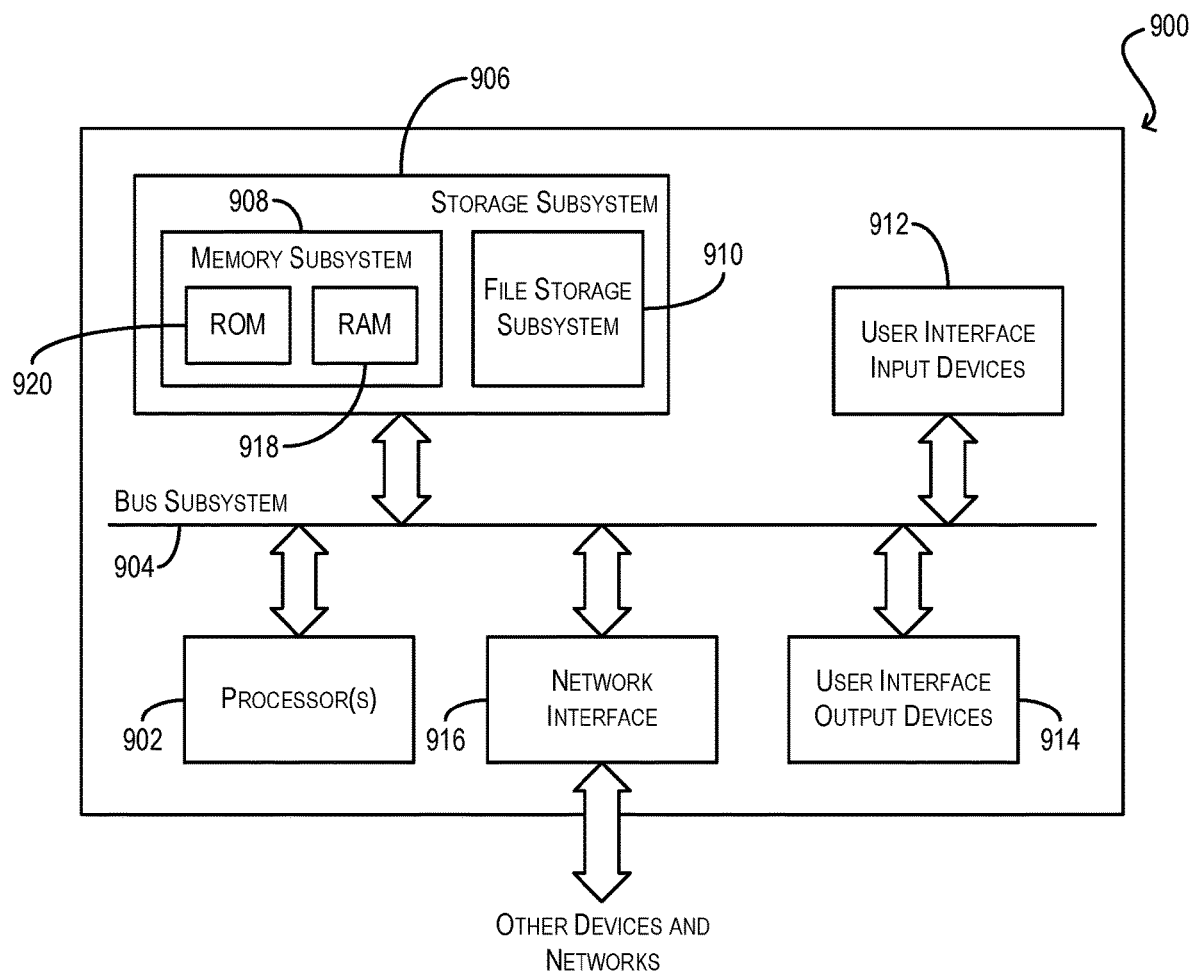
FIG. 9 depicts an example computer system according to an embodiment.

FIG. 9 depicts an example computer system 900 in which certain embodiments of the present disclosure may be implemented. For example, in one set of embodiments, computer system 900 may be used to implement packet broker 206 of FIG. 2 (either wholly or in part).

As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple buses.

Network interface subsystem 916 can serve as an interface for communicating data between computer system 900 and other computing devices or networks. Embodiments of network interface subsystem 916 can include wired (e.g., coaxial, twisted pair, or fiber optic Ethernet) and/or wireless (e.g., Wi-Fi, cellular, Bluetooth, etc.) interfaces.

User interface input devices 912 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 900.

User interface output devices 914 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of various embodiments described herein.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than computer system 900 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method, comprising:
   receiving, by a packet broker in a visibility network, a control packet replicated from a core network, the control packet including a device identifier and a request to create a user session based on the device identifier;
   determining, by the packet broker based on the device identifier and one or more parameters, a rank value for the user session, the rank value indicating an amount of network traffic to be generated in the core network during the user session;
   selecting, by the packet broker, an egress port of the packet broker for the user session based on the rank value; and
   forwarding, by the packet broker, subsequent control and data traffic for the user session through the selected egress port.

2. The method of claim 1, wherein the core network is a mobile network and wherein the user or device identifier is an International Mobile Subscriber Identity (IMSI) or an International Mobile Equipment Identity (IMEI).

3. The method of claim 1, wherein the one or more parameters comprise historical network usage information.

4. The method of claim 1, wherein the one or more parameters comprise a previous rank value determined by the packet broker for a previous user session.

5. The method of claim 1, wherein the one or more parameters comprise billing information, calendar information, or a current device location.

6. The method of claim 1, further comprising:
   receiving, by the packet broker, at least one of the one or more parameters from another system or device that is external to the packet broker.

7. The method of claim 1, wherein the determining the rank value comprises:
   providing the device identifier and the one or more parameters as input to a neural network-based predictor.

8. The method of claim 1, wherein the packet broker maintains one instance of the neural network-based predictor for each device identifier received by the packet broker.

9. The method of claim 7, wherein the neural network-based predictor comprises a first stage and a second stage,
   wherein the first stage is configured to provide a compressed representation of the device identifier and the one or more parameters to the second stage, and
   wherein the second stage is configured to predict the rank value for the user session based on the compressed representation.

10. The method of claim 9, wherein the second stage is trained for a given user by:
  providing, as input to the second stage, a vector including input parameters associated with the given user;
  setting, as a target output of the second stage, a manually-assigned rank value for the vector; and
  adjusting one or more network weights in the second stage to generate the manually-assigned rank value.

11. The method of claim 1, wherein the selecting the egress port comprises:
  calculating a hash function based on the rank value; and
  generating an output value corresponding to the rank value modulo a total number of egress ports of the packet broker.

12. The method of claim 1, further comprising:
  classifying users of the core network into a plurality of clusters.

13. The method of claim 12, further comprising, prior to the determining the rank value:
  determining whether a user associated with the device identifier is a new user; and
  in response to the user being the new user:
    identifying a cluster in the plurality of clusters to which the user belongs;
    retrieving an average network usage value and average rank value for users in the identified cluster; and
    determining the rank value for the user session based, at least in part, on the average usage value and the average rank value.

14. The method of claim 1, wherein higher values for the rank value indicate that more network traffic is to be generated in the core network during the user session, and wherein lower values for the rank value indicate that less network traffic is to be generated in the core network during the user session.

15. A non-transitory computer readable storage medium having stored thereon program code executable by a packet broker in a visibility network, the program code when executed by the packet broker causes the packet broker to:
  receive a control packet replicated from a core network, the control packet including a device identifier and a request to create a user session based on the device identifier;
  determine, based on the device identifier and one or more parameters, a rank value for the user session, the rank value indicating an amount of network traffic that is likely to be generated in the core network during the user session;
  select an egress port of the packet broker for the user session based on the rank value; and
  forward subsequent control and data traffic for the user session through the selected egress port.

16. The non-transitory computer readable storage medium of claim 15, wherein the program code that causes the packet broker to determine the rank value comprises program code that causes the packet broker to:
  provide the device identifier and the one or more parameters as input to a neural network-based predictor.

17. The non-transitory computer readable storage medium of claim 15, wherein the program code that causes the packet broker to select the egress port comprises program code that causes the packet broker to:
  calculate a hash function based on the rank value; and
  generate an output value corresponding to the rank value modulo a total number of egress ports of the packet broker.

18. A packet broker, comprising:
  a processor; and
  a non-transitory computer readable medium having stored thereon program code that, when executed by the processor, causes the processor to:
  receive a control packet replicated from a core network, the control packet including a device identifier and a request to create a user session based on the device identifier;
  determine, based on the device identifier and one or more parameters, a rank value for the user session, the rank value indicating an amount of network traffic that is likely to be generated in the core network during the user session;
  select an egress port of the packet broker for the user session based on the rank value; and
  forward subsequent control and data traffic for the user session through the selected egress port.

19. The packet broker of claim 18, wherein the program code that causes the processor to determine the rank value comprises program code that causes the processor to:
  provide the device identifier and the one or more parameters as input to a neural network-based predictor.

20. The packet broker of claim 18, wherein the program code that causes the processor to select the egress port comprises program code that causes the processor to:
  calculate a hash function based on the rank value; and
  generate an output value corresponding to the rank value modulo a total number of egress ports of the packet broker.

* * * * *